Feb. 13, 1968 R. GUNDELFINGER ETAL 3,368,793

SLIDABLE VALVE WITH ABUTTING PIPE FLANGES AS SEAT MEMBERS

Filed Feb. 17, 1966

INVENTORS
RICHARD GUNDELFINGER
DARRELL B. McCOMAS
BY Samuel Lindenberg
ATTORNEY

United States Patent Office 3,368,793

Patented Feb. 13, 1968

3,368,793

SLIDABLE VALVE WITH ABUTTING PIPE FLANGES AS SEAT MEMBERS

Richard Gundelfinger, Berkeley, and Darrel B. McComas, Oakland, Calif., assignors to Chromatronix Incorporated, Berkeley, Calif., a corporation of California Filed Feb. 17, 1966, Ser. No. 528,210
3 Claims. (Cl. 251—174)

This invention relates to valves, and more particularly to improvements therein.

Valves generally are of two types. One type has a moving stem which seats in order to accomplish a closure, and the other type is the sliding or rotary port type in which a moving member is moved relative to the stationary body of the valve to open or close the flow passages. In the moving port type of valve, the passages can be sealed against leakage to the surroundings, or leakage between adjacent passages either by sealing gaskets, usually resilient, or by making the mating surfaces between moving and stationary members very closely fitting (such as a tapered plug valve or glass stop cocks). While the sliding or rotary port type of valve has the advantage of uniform passages without dead volumes or stagnant cavities, the other types of valve designs usually introduce varying degrees of dead volumes. In the case of the sliding or rotary port type valve, it is extremely difficult to make them with non-leaking mating surfaces which will operate at a high pressure. The problem arises with the requirement of precision in the mating surfaces.

An object of the present invention is the provision of a valve having sliding surfaces, which is simple to manufacture.

Still another object of the present invention is the provision of a valve of the sliding surface type which will operate without leakage at high pressure.

Yet another object of the present invention is the provision of a novel, useful and inexpensive valving arrangement.

These and other objects of the invention are achieved by forming a flange at the end of two pieces of tubing, which are to be coupled to one another through a valving arrangement. Between the two flanged ends of the two pieces of tubing there is positioned a slidable member having an opening therethrough for enabling the two pieces of tubing to communicate with one another through this opening when it is aligned with the tubing openings. A coupling member which fits over the region wherein the two pieces of tubing abut the slidable member has a slot therethrough through which the slidable member may be moved. The coupling member is fitted over the region of the tubing wherein the two flanged ends abut the slidable member which can then be moved through the slit in the coupling member. The ends of the coupling member are threaded. Springs are placed adjacent the flanged ends of the tubing and stopper members having openings therethrough through which the tubing passes are threaded into the ends of the coupling member to bring pressure upon the springs which in turn urge the flanged ends of the tubing against the flat slidable member.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
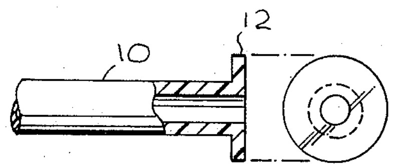
FIGURE 1 is a cross-sectional view of a tube with a flange at the end thereof, shown to illustrate the preparation of the tube end for use as a part of a valve mechanism in accordance with this invention.

FIGURE 1 represents in cross-section a tube 10 whose end 12 has had a flange formed thereon. With plastic tubing such as "Teflon," with which this invention finds its optimum use, the end of the tube is flanged simply by forcing the tubing end against a heated plate which heats the tubing above the temperature at which the plastic can be deformed. This causes the end of the tubing to flare outwardly in the shape of a flat flange.

Figure 2:
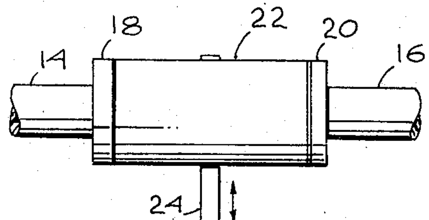
FIGURE 2 illustrates the external appearance of a valve mechanism in accordance with this invention.

FIGURE 2 shows the external appearance of a two-way valve made in accordance with this invention. Two tubes 14, 16 are brought to the valve structure which includes two respective capping members 18, 20, which are threaded into a cylindrical coupling member 22. The coupling member has an opening therethrough so that the valve slide member 24 can be moved reciprocally therein. The motion of the valve sliding member, as will be shown in connection with the description of FIGURE 3, serves to permit free passage between tubes 14 and 16, or to block passage between these tubes.

Figure 3:
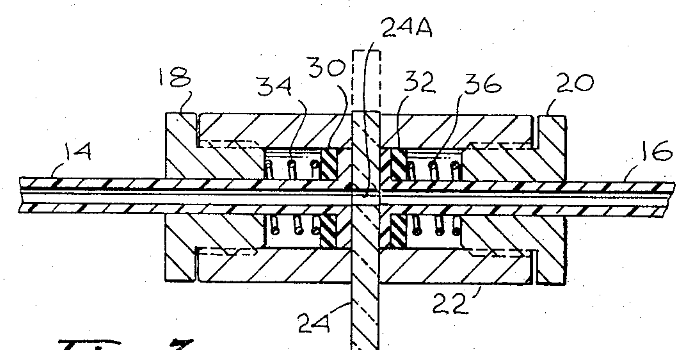
FIGURE 3 is a cross-sectional view illustrating the components of a valve mechanism in accordance with this invention.

FIGURE 3 is a cross-sectional view of the arrangement shown in FIGURE 2. The two tubes 14, 16 have their flanged ends pressed against the sliding member 24 by structure comprising two washers respectively 30, 32, which are biased against the flanged ends by the respective springs respectively 34, 36. The capping members respectively 18, 20 are threaded down into the cylindrical coupling member 22 until sufficient pressure is brought to bear upon the flanged ends of the tubes so that no leakage occurs between the surface of the sliding member 24, and the flanged ends of the tubes. The coupling member bears against the edges of the washers to prevent them from moving sidewards when the sliding member is moved. The valve slide member 24 has an opening 24A therethrough, which can be positioned to permit free passage between the two tubes, or, by sliding movement of the member 24, is moved away from between the two tubes so that they are blocked.

Figure 4:
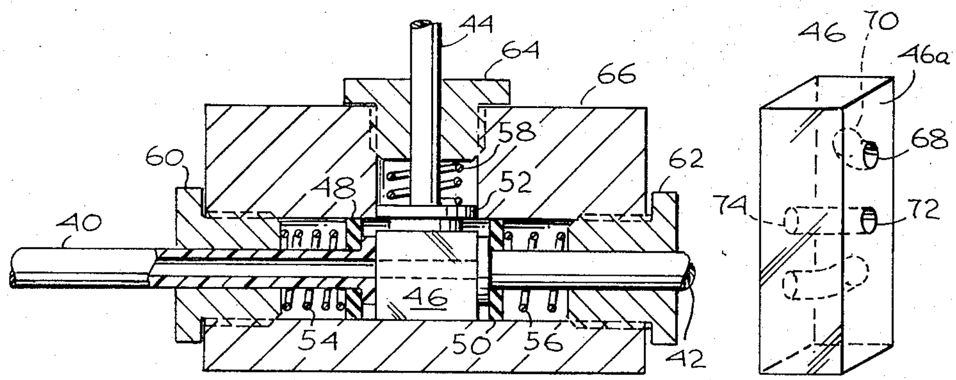
FIGURE 4 is a cross-sectional view illustrating how this invention may be employed for a three-way valve mechanism.

FIGURE 4 shows another arrangement employing the concepts of this invention, for a three-way valve. Three tubes respectively 40, 42, 44 have their ends flanged and abutting upon a valve slide member 46. Adjacent each flange of each tube there are respectively the washers 48, 50, 52. A spring respectively 54, 56, 58 biases the washer and the flange downwardly against the valve slide member 46. A cap member 60, 62, 64 respectively urges each one of the springs 54, 56, 58 against the respective washers. The respective cap members are threadably engaged in a holding or coupling member 66. It will be recognized that this member serves the same function as the member 22 in FIGURE 3. It will have a slot (not shown) therethrough so that the member 46 can slide for intercoupling the various pipes. It bears on the edges of the washers to keep them from sliding sidewards when the member 46 is slid. It also serves to hold the member 46 in place against the push of the spring 58.

Figure 5:
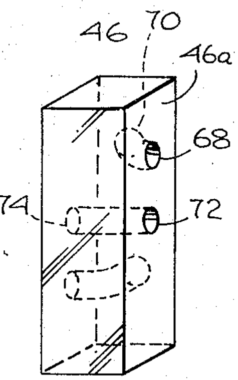
FIGURE 5 is a perspective view of the slidable member of a three-way valve system.

FIGURE 5 is a representation in perspective of the slidable member 46. Assume that the face labelled 46A is opposite the pipe 50. As the slidable member is moved upwardly, the opening 68 which is coupled to the opening 70, represented in dotted lines and which is on the surface of the slidable member 46 adjacent the flanged end 52 of the pipe 44, aligns the opening in pipe 42 with the opening in pipe 44. The slidable member is then given another upward increment until the opening 72 is aligned with the pipe 42 whereby the opening (represented by dotted lines) 74 is aligned with the pipe 40. The next upward increment of the slidable member 46 aligns openings (represented by dotted lines therein) so that a pipe 40 is in communication with the pipe 44.

Figure 6:
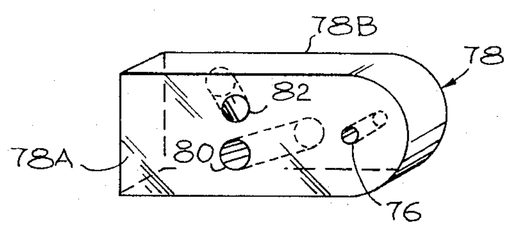
FIGURE 6 is a perspective view illustrating a pivotal slidable member.

While the description of the embodiments of the invention have been made illustrating the slidable member as being reciprocally slidable along a linear axis and coupling two or three pipes, it will be appreciated that the slidable member may also be slid as well as rotated to provide coupling between two, three or more pipes as well as the blocking thereof. For example, FIGURE 6 shows a slidable member which may be rotated about a pivot 76 to couple or block two or more tubes to one another. A pivotable slidable member 78 has opposite faces respectively 78A, 78B, against which the flanges of two or more pipes may be pressed. By pivoting the spacer member 78 the apertures between the two faces 78A and 78B are brought into alignment so that a single pipe adjacent the face 78A will communicate with two or more pipes adjacent 78B when it lines up with one or the other of the two openings 80, 82. The openings on the surface 78B which communicate with the openings 80, 82 are shown by dotted circles thereon.

From the foregoing description, it should further be appreciated that while the pipes on opposite sides of the slidable member are shown as substantially aligned with one another, they need not be.

The advantage of the design which is provided by this invention is that the tube passages are sealed at the relatively small surface formed by the flange. Since the surface area is small, the force required for sealing is small. The result is that the slidable member can be moved easily even when the valve is adjusted for high pressure.

An additional advantage of the design is that it can provide a valve which is chemically inert. The materials which come in contact with the fluids flowing in the tubing are the tubing itself and the slidable member. Chemically inert plastics such as polytetrafluoroethylene (Teflon) or polytrifluorochloroethylene (Kel-F) can be used for tubing and glass, quartz, ceramics or Kel-F can be used for the slidable member. By way of example, and not to serve as a limitation upon the invention, a valve made of "Teflon" tubing with 1/16 inch O.D. and 1/32 inch I.D. and with either a glass or Kel-F slidable member operated satisfactorily up to 500 pounds per square inch pressure.

There has accordingly been described and shown herein a novel, simple and efficient valve.

What is claimed is:

1. A valving mechanism for controlling the communication between two pipes comprising flange means at the ends of said two pipes, a slidable member having two opposite faces, means for resiliently biasing said flange means against said two opposite faces of said slidable member, including a cap member for each pipe, each cap member having an opening therethrough for slidably supporting said pipe, a spring extending between a flange on a pipe and said cap member, a coupling member comprising walls defining a chamber for enclosing the region between said cap members, and threaded openings in said walls for inserting said cap members for compressing said springs against said flanges, and an opening through said slidable member for enabling communication between said two pipes only when said opening is aligned with the openings in said pipes.

2. Apparatus as recited in claim 1 wherein said pipes and said slidable member are made of chemically inert plastic material.

3. Apparatus as recited in claim 1 wherein said coupling member is cylindrical and has an opening therethrough through which said slider member extends.

References Cited

UNITED STATES PATENTS

| | | | |
|---|---|---|---|
| 2,879,797 | 3/1959 | Guaraldi | 251—174 X |
| 3,132,669 | 5/1964 | Feldsted | 251—174 X |

FOREIGN PATENTS

| | | |
|---|---|---|
| 108,815 | 2/1928 | Austria. |
| 724,917 | 9/1942 | Germany. |
| 329,898 | 5/1930 | Great Britain. |

M. CARY NELSON, *Primary Examiner.*

ARNOLD ROSENTHAL, *Assistant Examiner.*